E. H. MESSITER.
CONVEYER FEED CONTROL.
APPLICATION FILED DEC. 12, 1918.

1,344,768.

Patented June 29, 1920.
2 SHEETS—SHEET 1.

Inventor
Edwin H. Messiter
By his Attorneys
Marshall & Dearborn

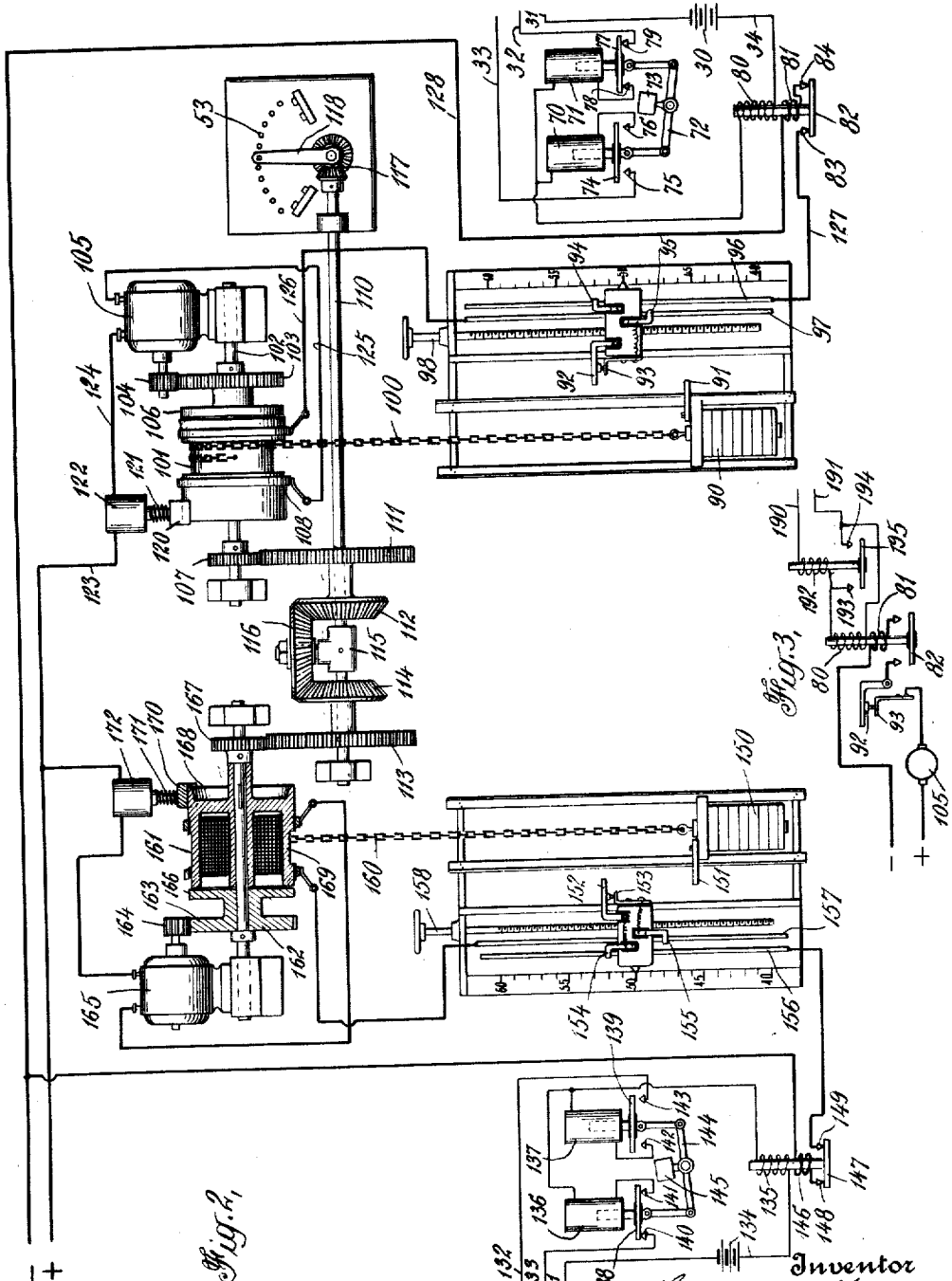

UNITED STATES PATENT OFFICE.

EDWIN H. MESSITER, OF BROOKLYN, NEW YORK, ASSIGNOR TO ELECTRIC WEIGHING COMPANY, OF NEW YORK, N. Y., A CORPORATION OF NEW YORK.

CONVEYER FEED CONTROL.

1,344,768.  Specification of Letters Patent.  Patented June 29, 1920.

Application filed December 12, 1918. Serial No. 266,392.

*To all whom it may concern:*

Be it known that I, EDWIN H. MESSITER, a citizen of the United States of America, and a resident of Brooklyn, Kings county, and State of New York, have invented certain new and useful Improvements in Conveyer Feed Controls, of which the following is a specification, reference being had to the accompanying drawings, forming a part thereof.

My invention relates to new and useful improvements in feed controls for conveyers and its object is to provide a simple and reliable apparatus for automatically varying the amount of material carried by one or more conveyers to be proportional to that carried by another conveyer.

In order that my invention may be thoroughly understood, I will now proceed to describe the same in the following specification, and will then point out the novel features thereof in appended claims.

Referring to the drawings:

Fig. 2 is an elevation, partly in section, on a larger scale, of the feed control mechanism shown in Fig. 1.

Fig. 3 is a detail of a modified arrangement of a motor, some of the automatic switches and the circuits therefor which may be used in carrying out this invention.

Figure 1:
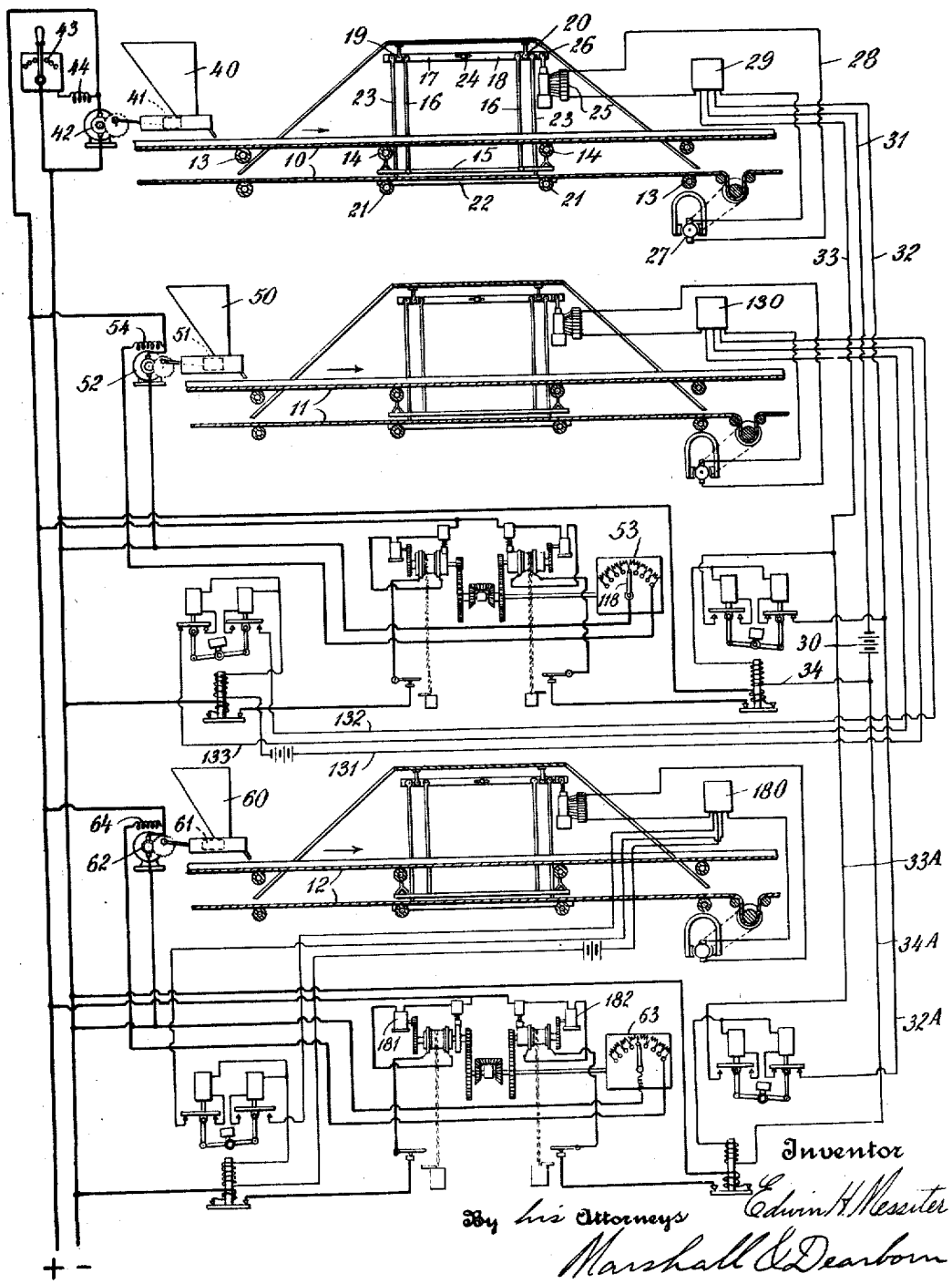
Figure 1 is a diagrammatic representation of a conveyer system comprising three belt conveyers and associated parts which embody this invention.

10, 11 and 12 designate three conveyer belts, each of which runs over a continuous weigher. As in the drawings these are of similar construction, a detailed description of one of them will suffice. The belts as in common practice are endless and are supported on rollers 13. They are provided with some suitable driving mechanism, not shown, by which they are given a continuous movement in one direction while in operation. 14—14 are supporting rollers for a part of the upper portion of the belt. These are mounted on a frame 15 which is suspended by rods 16—16 from scale beams 17 and 18, to which they are connected at a like distance from their fixed pivotal supports 19 and 20 inside of these supports. Rollers 21—21 support a like length of the lower portion of the belt. These rollers are on a frame 22 which is suspended from the same scale beams by rods 23—23 connected to the scale beams on the outside of their pivotal supports and at the same distance therefrom as the rods 16. Between the scale beams is a slot and pin connection at 24. The scale beam 17 is extended beyond the point at which one of the rods 23 is connected with beam 18 and a movable member of an adjustable rheostat 25 is connected with this extended part at 26.

27 is a magneto driven by the conveyer belt and arranged to generate a voltage proportional to the rate at which the conveyer belt is driven. The rheostat 25 is in the circuit 28 of the magneto armature and a meter 29 is also in this circuit. 30 is a battery from which a conductor 31 leads to the meter. 32 and 33 are other conductors connected with the meter 29.

Material on the upper part of the conveyer belt depresses the rollers 14—14 and the scale beams 17 and 18, and automatically adjusts the rheostat 25 to decrease its resistance. If any material adheres to the conveyer belt it will have a tendency to depress the rollers 21 and this will counteract the effect of the depression of rollers 14 to an extent proportional to the difference in weight between the material on the upper and the lower part of the conveyer belt. Consequently the rheostat 25 will be varied to an extent proportional to the delivered load of the conveyer. As the voltage of the magneto is proportional to the speed of the conveyer, the meter is affected by the load delivered by the conveyer. The meter is arranged to close circuits alternately between conductors 31—32 and 31—33, and is calibrated to close one of these circuits every time a given load such for example as 100 lbs. passes over the conveyer scale.

40 is a hopper from which material is fed onto the conveyer belt by the reciprocation of a plunger 41 driven by a shunt wound motor 42. The armature of this motor is across the mains. A rheostat 43 is in series with its field coil, which for the purpose of illustrating the connections is shown outside of the motor and designated by 44. The rheostat 43 is adjusted by hand, and it is obvious that the rate at which material may be fed onto the conveyer may be varied at will.

50 is a hopper for the conveyer 11 and its plunger 51 is driven by a shunt motor 52 of which the armature is connected across the power mains and 53 is an automatically actuated rheostat in its field 54.

Similar parts are provided for the conveyer 12 designated respectively by 60—61—62—63 and 64.

70 and 71 are solenoids of which the cores are connected by a walking beam 72 centrally pivoted and with a weight 73 above its pivot point. 74 is a movable contact on the core of solenoid 70 and over two stationary contacts 75—76. 77 is a movable contact on the core of solenoid 71 and over stationary contacts 78—79.

Another solenoid comprises two windings 80—81, a movable contact 82, and stationary contacts 83—84. An adjustable automatic circuit breaker is provided which has a vertically movable guided weight 90 from which projects a finger 91 which is adapted to engage and lift a switch arm 92 from a contact 93 on which it rests. The switch arm 92 and contact 93 are electrically connected with brushes 94—95 respectively, which are slidable on strips 96—97. 98 is a screw by means of which the vertical position of this switch arrangement may be adjusted.

The weight 90 is suspended from a chain 100 which is wound on a drum 101 rotatively mounted on a shaft 102. A gear member 103 rotatively mounted on the same shaft on one side of the drum, is arranged to be driven by a pinion 104 on the armature shaft of a motor 105. This gear member has a disk 106 adjacent one end of the drum 101. On the other side of the drum on shaft 102 is another gear member 107 having a disk 108 adjacent its end of the drum.

110 is a shaft parallel with shaft 102. Rotatively supported on it is a member which comprises a spur gear 111 in mesh with the gear member 107, and a bevel gear 112. A similar member on shaft 110 comprises a spur gear 113 and a bevel gear 114. A collar 115 affixed to the shaft 110 has a radial pin on which is rotatively supported a bevel gear 116 in mesh with bevel gears 112 and 114. A pair of bevel gears 117 are provided for the purpose of transmitting the rotation of shaft 110 to the contact arm 118 of the rheostat 53.

A brake shoe 120 is pressed against the periphery of the disk 108 by a spring 121. This shoe is on the core of a solenoid 122 which, when energized, lifts the brake shoe against the action of spring 121 off from disk 108.

From the meter 130 which is electrically connected with the conveyer 11 are three wires 131—132—133. The wire 131 runs through a battery 134 to solenoid winding 135 and from thence to the windings of a pair of solenoids 136 and 137 which control movable contacts 138 and 139 under which are stationary contacts 140—141 and 142—143. The cores of these solenoids are mechanically connected by a walking beam 144 centrally pivoted with a weight 145 above its pivot point. 146 is a series winding in alinement with winding 135 and the core of this double wound solenoid controls a movable contact 147 under stationary contacts 148 and 149.

The parts designated by the reference numerals 150—158 are similar to and correspond with the parts 90—98 respectively, and the parts designated by 160—168 are like parts 100—108, except that the chain 160 is wound on drum 161 in the opposite direction. 169 is a winding within the drum 161 and it is to be understood that there is a similar winding within the drum 101. The brake parts 170—172 are similar to those designated by 120—122.

The operation of the apparatus may be described as follows: When the circuit between wires 31 and 32 is closed at the meter 29 current passes from the battery 30 through conductor 34, solenoid winding 80, the winding of solenoid 71, contacts 78—77—79, and back to the battery through wire 32. This will cause contact 82 to be raised to bridge contacts 83—84 which will close a circuit from the supply line by wires 123 through winding of brake magnet 122 to raise the brake shoe 120, by wire 124 to motor 105, by wire 125 from the motor to the winding within the drum 101 (not shown) by wire 126 to contact strip 97, through contacts 95—93—92—94 to contact strip 96 and by wire 127 through contacts 83—82—84, solenoid winding 81 and wire 128 back to the supply line.

This will cause motor 105 to rotate and drive gear member 103. The drum 101 will be magnetized to cause it to attract and engage disk 106 and to cause the gear member 107 to rotate with it and this will effect a slow rotation to the gear 112 which will tend to carry the gear 116 and collar 115 around the axis of shaft 110 to rotate this shaft and move rheostat arm 118 in one direction, which movement will continue until the circuit through motor 105 is broken. The rotation of drum 101 will raise weight 90 until its finger 91 raises contact 92 from contact 93 to break the motor circuit. This circuit also passes through brake solenoid 122 and the winding within drum 101 and solenoid winding 81. These will be deënergized, the brake shoe 120 will stop the rotation of shaft 110, the drum 101 will cease being magnetically attracted to disk 106, the weight 90 will drop back to its original position, and the contact 82 will drop away from contacts 83—84.

At the same time the solenoid 80 is energized, that of solenoid 70 is also energized to raise its core and contact 77 from contacts 78—79 and to lower movable contact 74 onto contacts 75—76, and the weight 73 will hold the contacts 77—74 in this new position. The raising of contact 77 will break the circuits through solenoid 71 and the winding 80, but the contact 82 will be maintained by the series winding 81 until this is broken at 92—93. This arrangement is such that the motor 105 will cause the cycle of operations described to be performed once when a circuit is closed at the meter 29 between wires 32—31 but this operation will not be repeated by another accidental closure of this circuit as it is broken between contacts 78—79 until the contact 77 is again lowered. Neither will the motor circuit be closed by the closure of the contacts 92—93 until solenoid winding 80 is again energized.

The cycle of operations described will be repeated when a circuit is closed at meter 29 between wires 31 and 33 and the circuits energized will be the same as that described except that this time solenoid 70 will be energized instead of solenoid 71 and contacts 75—76 disconnected and contacts 78—79 connected.

Therefore the connections alternately made between wires 31—32 and 31—33 at meter 29 which occur at a rate proportional to the rate at which material passes over conveyer belt 10 will each cause a cycle of operations to be performed which will tend to move the rheostat arm 118 in one direction. The rheostat 53 is in the field winding 54 of motor 52 and the direction of movement of arm 118 caused by the aforesaid cycles of operation is in the direction to increase the resistance in this field winding to speed up motor 52 and to increase the rate of delivery of material to conveyer belt 11.

The effect of the material passing over conveyer belt 11 is to alternately close circuits between wires 131—132 and 131—133 at a rate proportional to the rate the material passes over this conveyer. These wires are connected in the way described with solenoids 136—137 and with solenoid windings 135—146. These operate and control the circuit through brake solenoid 172, motor 165, drum winding 169 and contacts 152, 153 in a manner similar to that already described. The parts actuated by motor 165 however have a tendency to move rheostat arm 118 in the opposite direction to slow down motor 52.

It may be seen that the periods at which contacts 92—93 and contacts 152—153 are opened by their respective weights 90 and 150, depend upon the length of travel of these weights and that this may be varied at will by setting the positions of these automatic circuit breakers by means of the adjusting screws 98 and 158. By this means the proportion of material passing over conveyer belt 11 to that passing over conveyer belt 10 may be maintained automatically, and the proportion varied to any desired extent by the screws 98 and 158.

The number of conveyers thus automatically controlled is not limited. For example, in Fig. 1, a third conveyer belt 12 is shown with a resistance 63 in the field of its feeder motor 62. This conveyer has a meter 180 with connected devices arranged to intermittently actuate a motor 181 to reduce the amount of the resistance 63 in field 64, and to slow down motor 62 while the wires 32$^A$, 33$^A$ and 34$^A$ are extended from meter 29 to actuate devices which control motor 182 to increase the amount of the resistance 63 in field 64 to increase the speed of motor 62. Thus the amount of material fed to conveyer 12 is dependent upon the amount of material which passes over conveyer 10 although it is entirely independent of the amount of material which passes over the conveyer 11.

The modification illustrated in Fig. 3 is one adapted for use when meters which intermittently close only one circuit, that between wires 190 and 191 are used. The wire 190 passes to solenoid winding 192 from which it is connected with a stationary contact 93 and the solenoid winding 80, the other end of which is connected to a stationary contact 194. The wire 191 is connected with the lower end of solenoid 80 and to a stationary contact 194. The solenoids 192 and 80 are therefore energized simultaneously. The movable contact 82, as before, closes a maintaining circuit through the winding 81. The solenoid 192 at the same time, raises a movable contact 195 across contacts 193—194 which short circuits winding 80 and prevents a repetition of the cycle of operations performed by the motor 105 by an accidental connection of wires 190 and 191 before the cycle of operations has been completed.

Arrangements of preferred form and construction have been illustrated and described for the purpose of showing how this invention may be used, but the inventive thought upon which this application is based is broader than these illustrative embodiments thereof, and I therefore intend no limitations other than those imposed by the appended claims.

What I claim is:

1. A master conveyer, one or more other conveyers, automatic means for feeding material onto said other conveyer or conveyers at variable rates, a feeder control for each automatic feeder comprising a pair of driven gears and an intermediate gear, connections between each intermediate gear and its feeder, means controlled by the master conveyer for rotating one of each pair of driven gears in one direction, and means controlled by each other conveyer for rotating the other driven gear of its respective feeder control, in the opposite direction.

2. A master conveyer, one or more other conveyers, automatic means for feeding material onto said other conveyer or conveyers at variable rates, a feeder control for each automatic feeder comprising a pair of driven gears and an intermediate gear, connections between each intermediate gear and its feeder, means controlled by the master conveyer for rotating one of each pair of driven gears in one direction, means controlled by each other conveyer for rotating the other driven gear of its respective feeder control, in the opposite direction, and adjustable means for limiting the amount of rotation of the driven gears.

3. A master conveyer, one or more other conveyers, a weighing device for each conveyer, automatic means for feeding material onto said other conveyer or conveyers at variable rates, a feeder control for each automatic feeder comprising a pair of driven gears and an intermediate gear, connections between each intermediate gear and its feeder, means controlled by the weighing device for the master conveyer for rotating one of each pair of driven gears in one direction, and means controlled by the weighing device for each other conveyer for rotating the driven gear of its respective feeder control, in the opposite direction.

4. A master conveyer, one or more other conveyers, a weighing device for each conveyer, automatic means for feeding material onto said other conveyer or conveyers at variable rates, a feeder control for each automatic feeder comprising a pair of driven gears and an intermediate gear, connections between each intermediate gear and its feeder, means controlled by the weighing device for the master conveyer for rotating one of each pair of driven gears in one direction, means controlled by the weighing device for each other conveyer for rotating the driven gear of its respective feeder control, in the opposite direction, and an independent adjustable device for each driven gear for limiting the amount of its rotation.

5. A master conveyer, one or more other conveyers, a weighing device for each conveyer, a feeder for the master conveyer, manual means for adjusting the rate of actuating of said feeder, means for feeding material onto said other conveyer or conveyers at variable rates, an automatic feeder control for each variable feeder comprising a pair of driven gears and an intermediate gear, connections between each intermediate gear and its feeder, means controlled by the weighing device for the master conveyer for rotating one of each pair of driven gears in one direction, and means controlled by the weighing device for each other conveyer for rotating the driven gear of its respective feeder control, in the opposite direction.

6. A master conveyer, one or more other conveyers, means associated with each conveyer for producing intermittent impulses at rates proportional to the weight of material passing over the respective conveyers in a predetermined time; an automatic feeder for each other conveyer or conveyers, a movable member for each feeder arranged to vary the rate of its actuation, means actuated by each impulse produced by the master conveyer means for imparting a continuous movement to said member or members in one direction, and means actuated by each impulse of another of the conveyer means for imparting a continuous movement to its member in the opposite direction.

7. A master conveyer, one or more other conveyers, means associated with each conveyer for producing intermittent impulses at rates proportional to the weight of material passing over the respective conveyers in a predetermined time; an automatic feeder for each other conveyer or conveyers, a movable member for each feeder arranged to vary the rate of its actuation, means actuated by each impulse produced by the master conveyer means for imparting a continuous movement to said member or members in one direction, an automatic stop for arresting said movement, and means actuated by each impulse of another of the conveyer means for imparting a continuous movement to its member in the opposite direction and an automatic stop for arresting said movement.

8. A master conveyer, one or more other conveyers, means associated with each conveyer for producing intermittent impulses at rates proportional to the weight of material passing over the respective conveyers in a predetermined time; an automatic feeder for each other conveyer or conveyers, a movable member for each feeder arranged to vary the rate of its actuation, means actuated by each impulse produced by the master conveyer means for imparting a continuous movement to said member or members in one direction, an automatic stop for arresting said movement, means actuated by each impulse of another of the conveyer means for imparting a continuous movement to its member in the opposite direction, an automatic stop for arresting said movement, and means for adjusting said automatic stops.

9. A master conveyer, one or more other conveyers, means associated with each conveyer for producing intermittent impulses at rates proportional to the weight of material passing over the respective conveyers in a predetermined time; an automatic feeder for each other conveyer or conveyers, a movable member for each feeder arranged to vary the rate of its actuation, means actuated by each impulse produced by the master conveyer means for imparting a continuous movement of said member or members in one direction, means actuated by each impulse of another of the conveyer means for imparting a continuous movement to its member in the opposite direction, and differential gearing interposed between said movement imparting means.

10. A master conveyer, one or more other conveyers, means associated with each conveyer for producing intermittent impulses at rates proportional to the weight of material passing over the respective conveyers in a predetermined time; an automatic feeder for each other conveyer or conveyers, a movable member for each feeder arranged to vary the rate of its actuation, means actuated by each impulse produced by the master conveyer means for imparting a continuous movement to said member or members in one direction, an automatic stop for arresting said movement, means actuated by each impulse of another of the conveyer means for imparting a continuous movement to its member in the opposite direction, an automatic stop for arresting said movement, means for adjusting said automatic stops, and differential gearing interposed between said movement imparting means.

11. A master conveyer, one or more other conveyers, an automatic feeder for each other conveyer, and a feeder control means differentially dependent upon the amount of material carried by the master conveyer and by the conveyer with which said feeder is associated, said control means comprising a pair of continuous movement actuators.

12. A master conveyer, one or more other conveyers, an automatic feeder for each other conveyer, a feeder control means differentially dependent upon the amount of material carried by the master conveyer and by the conveyer with which said feeder is associated, said control means comprising a pair of continuous movement actuators, and a stop for arresting the movement of the actuators.

13. A master conveyer, one or more other conveyers, an automatic feeder for each other conveyer, a feeder control means differentially dependent upon the amount of material carried by the master conveyer and by the conveyer with which said feeder is associated, said control means comprising a pair of continuous movement actuators, and an adjustable stop for arresting the movement of the actuators.

14. A master conveyer, one or more other conveyers, an automatic feeder for each other conveyer, and a feeder control means differentially dependent upon the amount of material carried by the master conveyer and by the conveyer with which said feeder is associated, said control means comprising a pair of rotary motors and a differential gear mechanism.

15. A master conveyer, one or more other conveyers, an automatic feeder for each other conveyer, a feeder control means differentially dependent upon the amount of material carried by the master conveyer and by the conveyer with which said feeder is associated, said control means comprising a pair of rotary motors and a differential gear mechanism, and a stop for arresting the movement of the motors.

In witness whereof I have hereunto set my hand this 10th day of December, 1918.

EDWIN H. MESSITER.

Attest:
GEO. W. BROWN.